United States Patent Office 3,776,877
Patented Dec. 4, 1973

3,776,877
METHOD OF PRODUCING EXTRUDED THERMOSET POLYURETHANES
Donald W. Kelley, Garland, and James F. White, Jr., Ronald B. Winslow, and Charles L. Coppock, Dallas, Tex., assignors to Thuron Industries, Inc., Dallas, Tex.
No Drawing. Continuation of abandoned application Ser. No. 804,258, Mar. 4, 1969. This application July 23, 1971, Ser. No. 165,743
Int. Cl. C08g 41/04, 51/36, 53/00
U.S. Cl. 260—31.8 M                 7 Claims

ABSTRACT OF THE DISCLOSURE

The process of producing an extruded thermosetting resin having a urethane linkage comprising: forming a mixture in reactive proportions of a diisocyanate and a polymer having reactive hydroxyl groups, the mixture being capable of being extruded, reacting the diisocyanate and the polymer to form said urethane linkages, extruding said mixture while extrudable, and prior to the completion of the reaction, into a predetermined form and permitting the reaction to complete to produce a thermosetting resin.

---

This is a continuation of our copending application Ser. No. 804,258, filed Mar. 4, 1969, now abandoned, which is expressly relied on herein.

This invention relates to novel methods of making useful thermosetting resin and plastic products. More specifically, the present invention is concerned with methods of preparing extruded resin products having thermosetting properties.

The preparation of extruded resin products having thermosetting properties has long been a desired goal. Particularly, the extrusion of a thermosetting resin on conventional thermoplastic equipment without the use of accessory equipment such as a vulcanization tube has not been previously possible on a commercial scale. Prior attempts to achieve these results have included extrusion of elastomers and rubber products which had properties intermediate between true thermoplastic and thermosetting. But there is no known method of making extruded products with true thermosetting properties without the use of heat treatment equipment at the end of he extrusion line or a time-consuming, expensive curing process.

The principal object of this invention is to provide a method of producing a thermoset material with conventional thermoplastic extrusion equipment.

Another object of this invention is the provision of a method of extruding a thermosetting resin having urethane linkages.

Primarily, the method of the present invention requires extruding a mixture of two or more reactants which are in the process of inter-reacting chemically at the time of the extrusion. The timing of the extrusion process after the mixing is quite important. The extrusion process should be completed while the reacting mixture remains sufficiently pliable or extrudable to allow extrusion. If the mixture of the reactants is not in an extrudable form from conventional extruders or has already formed a thermoset resin, extrusion would not be possible.

The reactants that have been found to be particularly useful in producing the thermoset resin from conventional extrusion apparatus are those that will produce a urethane linkage. Specifically, those materials having reactive isocyanate groups particularly the well-known diisocyanates, both aliphatic and aromatic, are to be utilized as one of the reactants. Among the diisocyanates that may be utilized in accordance with this invention may be included but are not limited to the following: alkylene diisocyanates such as methylene, ethylene, propylene, etc., diisocyanates; cycloalkylene diisocyanates such as cyclohexylene 1,2 or 4 diisocyanates; arylene diisocyanates such as tolylene diisocyanates; phenylalkyl diisocyanates wherein the alkyl group may contain from 1 to 12 carbons. Specifically included in this latter groupings are diphenylmethane diisocyanate, triphenylmethane diisocyanate, and the like; other aromatic diisocyanates such as those wherein the aromatic group may include naphthalene, benzene, benzyl, and specifically includes such compounds as 1,5 naphthalene, tolyl, diphenyl, and dibenzyl diisocyanates; cycloalkyl diisocyanates wherein the alkyl group may contain up to 4 to 8 carbon atoms and may include, for instance, 4,4'-dicyclohexylmethane diisocyanate; additional specific diisocyanate compounds included in the above groupings are 2,4-tolylene diisocyanate, 3,3'-dimethyl 4,4'-biphenylene diisocyanate, 3,3'-dimethoxy 4,4'-biphenylene diisocyanates, 4,4'-methylene di-o-tolyl diisocyanate, xenylene diisocyanate.

The other reactant necessary to establish a urethane linkage for the production of a thermoset resin may be any extrudable polymer material having a reactive hydroxyl group. Those compounds that are capable of reacting with diisocyanates are well known and those which may be extruded prior to completion of any cross-linking with the diisocyanate are included within the scope of the materials capable of forming a thermosetting resin through an extrusion process. Among those hydroxyl-containing materials are polymers such as: polyvinyl alcohol, polyvinyl acetals such as formal, acetal, butyral, and the like; polyvinyl acetate, polyvinyl chloride, hydroxylzed copolymers of vinyl acetate and vinyl chloride, polyglycols and polyols such as the polyalkylene glycols wherein each molecule may contain from 2 to 22 carbon atoms and include methylene, propylene, butylene, and the like; adducts with polyols such as glycerine, trimethylol propane, pentaerythritol, sorbitol, methylglucoside which may be formed as an adduct with propylene oxide or other alkylene oxides; hydroxyl-rich polyesters such as diethylene glycol adipate; polyethers containing hydroxyl groups are also usable and are known in the art as being reactive with diisocyanates to produce polyurethanes.

Additional resins that may be utilized in accordance with the present invention as being reactive with diisocyanates include any hydrolyzed extrudable polymers. Among such polymers found to be suitable are those which include polyvinyl acetate and polyvinyl chloride and copolymers thereof. The degree of hydrolysis of such copolymers, for instance, should be such as to result in a composition of the copolymer of 70–96.5 percent and preferably 85–95 percent vinyl chloride, 2–20 percent and preferably 4–10 percent vinyl alcohol, and 1.0–25 and preferably 2–8 percent vinyl acetate.

If any of the mixture of the ingredients is liquid making extrusion difficult, fillers such as diatomaceous earth, clay, or the like may be added as is well known in the art of extrusion.

It should be understood that at the time the diisocyanate and the hydroxyl containing polymer are mixed, the properties of the mixture may be but are not necessarily that of a thermoplastic mixture. It is only important that the physical form of the ingredients forming the mixture be such as to permit an extrusion. After the extrusion, the reaction between the diisocyanate and the hydroxyl containing polymer which may have begun at the time of mixing, and also may have continued during the extrusion, is completed to form a thermosetting resin. It is not necessary that the extruion take place prior to any reaction that may occur between the reactants. It is only important that the extrusion take place prior to the time the reaction between the ingredients forming the mixture has proceeded to an extent that will prevent extrusion. Generally, this will be within one hour after the admixture of the reactants, preferably within 30 minutes of the initial mixing.

At the time of the initial mixing, the diisocyanate and the hydroxyl containing polymer begin to undergo a cross-linkink reaction between the diisocyanate and the hydroxyl groups of different polymer molecules. When the reaction is completed following extrusion, the resulting resin product is a mixture of multiple cross-linked urethane groupings and is a true thermosetting resin product with properties similar to thermosetting resins which are formed in a conventional manner without any extrusion.

The apparatus which may be used to extrude the reaction mixture in accordance with this invention, may be of the conventional type well known in the art and may include the typical extrusion screw apparatus. Any suitable shape may be produced depending primarily upon the shape of the die opening. It is important to note that it is not necessary to provide any special curing apparatus or vulcanizing tubes to achieve the proper extrusion. At the time that the reacting mixture is extruded, it must not have proceeded to the point at which the cross-linking forming the urethane groupings will prevent the plastic mass from being extruded.

Any additive or catalyst necessary or desirable to either promote the reaction between the diisocyanate and the hydroxyl containing polymer or to provide some special or selected property or to assist extrusion may be added during the mixture of the reactants. The catalysts may include special chemicals well known to the art such as triethylene imine, dibutyltindiacetate, methylmorpholine, and the like.

Additionally, other additive ingredients may be used to enhance the properties of the finished products and may include stabilizers such as epoxy esters of higher aliphatic acids, metal salts of organic or inorganic salts, aryl or alkyl phosphites and others known in the art. The use or choice of a stabilizer or any of the additives is not critical to the present invention.

Plasticizers are particularly desirable although not necessary for many of the vinyl resins that may be utilized to form the thermosetting resins of the present invention. Preferred plasticizers for such vinyl resins include dioctylphthalate, dioctyl adipate and other alkyl phthalates.

Lubricants also may be added to assist the extrusion process. Such lubricants may include stearic acid, mineral oil, as well as other well known lubricants. Fillers, such as diatomaceous earth, clays and the like, also may be added in amounts up to 50 percent by weight of the final product.

In addition to the foregoing ingredients, it may be found important or desirable to form particular resin shapes, sizes, or characteristics. Numerous other chemicals may be added to achieve special effects or utility. As an example, dyes may be added to impart color to the finished product. Perfumes or deodorants may be added to give odor control characteristics. Insecticides, fungicides, rodenticides, anthelmintics, weed killers, and other biologically-active compounds may be added to give long-lasting solid generators for biological activity.

Examples of the useful added materials which may be present in an amount between 0.01 percent through 40 percent by weight of the resin may include insecticides such as beta,beta dichlorovinyl dimethyl phosphate (DDVP) or any other biologically-active compound having the desired volatility. The use of DDVP as the insecticide in extruded mixture is particularly desirable and the extruded resin mixture has been found to control the volatilization of this insecticide particularly when the resin is a terpolymer of polyvinyl alcohol, polyvinyl acetate, and polyvinyl chloride. The latter may also be referred to as a hydrolyzed copolymer of polyvinyl chloride and polyvinyl acetate.

The desired range of the weights of the reactive ingredients is not critical to the present invention and may vary from 30 to 50 parts of the polymer containing the hydroxyl groups to 1 part of the diisocyanate. For instance, in the reaction between tolylene diisocyanate and the polyvinyl alcohol-polyvinyl chloride-polyvinylacetate terpolymer, the optimum ratio is 3 parts of the diisocyanate to 50 parts of the terpolymer; but the range of terpolymer may vary from 30 to 50 parts of the vinyl terpolymer to each part tolylene diisocyanate.

The following examples illustrate the various facets of the present invention:

EXAMPLE I

|  | Parts |
|---|---|
| VAGH [1] | 100.0 |
| Tolylene diisocyanate | 11.7 |
| DiOctyl adipate | 20.0 |

[1] Vinyl chloride-acetate copolymer, manufactured by Union Carbide Chemical Company.

Mixing procedure:
(a) Charge high intensity mixer with VAGH.
(b) Mix tolylene diisocyanate and dioctyl adipate together and add to VAGH with mixer running.
(c) When the mix is dry and flowable, drop from mixer to cool.

Extrusion temperature for a Prodex 3½ in. compact extruder: 190–200° F.

EXAMPLE II

|  | Parts |
|---|---|
| Formvar 12/85 [1] | 100.0 |
| Tolylene diisocyanate | 12.0 |
| Diatomaceous earth | 20.0 |
| Dioctyl adipate | 30.0 |

[1] Polyvinyl formal, manufactured by Monsanto Chemical Company.

Mixing procedure:
(a) Charge high intensity mixer with Formvar 12/85.
(b) Premix tolylene diisocyanate and dioctyl adipate and add to Formvar with mixer running.
(c) Stop mixer, add diatomaceous earth.
(d) Mix until mixture is dry and flowable and drop from mixer to cool.

Extrusion temperatures are the same as Example I.

EXAMPLE III

|  | Parts |
|---|---|
| VAGH | 50.0 |
| Tolylene diisocyanate | 3.0 |
| Dioctyl adipate | 16.0 |
| Vapona [1] | 22.0 |
| Diatomaceous earth | 16.0 |

[1] O,O-dimethyl-O-2,2 dichlorovinyl phosphate.

Mixing procedure:
(a) Charge high intensity mixer with VAGH.
(b) Premix tolylene diisocyanate, dioctyl adipate and Vapona and add to VAGH while mixer is running.
(c) Stop mixer and add diatomaceous earth.
(d) Mix until mixture is dry and flowable and drop from mixer to cool.

Extrusion temperatures are the same as Example I.

EXAMPLE IV

|  | Parts |
|---|---|
| Apple blossom perfume | 13.9 |
| Isopropyl acetate | 25.0 |
| VAGH | 36.0 |
| Diatomaceous earth | 24.0 |
| Tolylene diisocyanate | 2.1 |

Mixing procedure:
(a) Charge high intensity mixer with VAGH.
(b) Premix perfume, isopropyl acetate and add to VAGH while mixer is running.
(c) Stop mixer and add diatomaceous earth.

(d) Mix until mixture is dry and flowable and drop from mixer to cool.

Extrusion temperatures: 160–180° F.

The products from each of the foregoing examples were excellent extrusions with all the properties of thermosetting resins.

What is claimed is:

1. The process of producing an extruded thermoset resin having urethane linkages comprising: admixing an organic diisocyanate containing reactive isocyanate groups and an organic polymer having reactive hydroxyl groups in reactive proportions, and being capable of reacting with said diisocyanate, until the mixture is dry and flowable and is capable of being extruded and then extruding said mixture within 1 hour after the admixture of the reactants while still extrudable and prior to the completion of the crosslinking reaction, into a shaped form and thereafter permitting the crosslinking reaction to continue and thereby producing a thermoset resin, said polymer being a copolymer of 70–96.5 percent vinyl chloride, 2–20 percent vinyl alcohol, and 1.0–25 percent vinyl acetate.

2. The process of claim 1 wherein the extruding takes place within 30 minutes after the admixture of the reactants.

3. The process of producing an extruded thermoset resin having urethane linkages comprising: admixing an organic diisocyanate containing reactive isocyanate groups and an organic polymer having reactive hydroxyl groups in reactive proportions, and being capable of reacting with said diisocyanate, until the mixture is dry and flowable and is capable of being extruded and then extruding said mixture within 1 hour after the admixture of the reactants while still extrudable and prior to the completion of the crosslinking reaction, into a shaped form and thereafter permitting the crosslinking reaction to continue and thereby producing a thermoset resin wherein the diisocyanate is tolylene diisocyanate and the polymer is a terpolymer of vinyl acetate, vinyl chloride and vinyl alcohol.

4. The process of producing an extruded thermoset resin having urethane linkages comprising: admixing an organic diisocyanate containing reactive isocyanate groups and an organic polymer having reactive hydroxyl groups in reactive proportions, and being capable of reacting with said diisocyanate, until the mixture is dry and flowable and is capable of being extruded and then extruding said mixture within 1 hour after the admixture of the reactants while still extrudable and prior to the completion of the crosslinking reaction, into a shaped form and thereafter permitting the crosslinking reaction to continue and thereby producing a thermoset resin wherein the organic diisocyanate is tolylene diisocyanate and the polymer is a copolymer of vinyl chloride and vinyl acetate, and wherein a filler and plasticizer are admixed with said diisocyanate and said polymer.

5. The process of claim 4 wherein the filler is diatomaceous earth and the plasticizer is dioctyl adipate.

6. A product produced by the process of claim 4.

7. A product produced by the process of claim 3.

References Cited

UNITED STATES PATENTS

| | | | |
|---|---|---|---|
| 2,801,648 | 8/1957 | Anderson et al. | 138—74 |
| 3,192,185 | 6/1965 | Achterhof et al. | |
| 3,233,025 | 2/1966 | Frye et al. | |
| 3,257,261 | 6/1966 | Hochberg | 161—88 |
| 3,400,173 | 9/1968 | Reischl et al. | |
| 3,438,916 | 4/1969 | Davis | 260—18 |

DONALD E. CZAJA, Primary Examiner

H. S. COCKERAM, Assistant Examiner

U.S. Cl. X.R.

260—18 TN, 23 TN, 37 N, 75 NE, 77.5 AA, 77.5 AM, 77.5 CR, 859